United States Patent
Higashiura et al.

(10) Patent No.: US 7,725,733 B2
(45) Date of Patent: May 25, 2010

(54) BIOMETRICS AUTHENTICATION METHOD AND BIOMETRICS AUTHENTICATION DEVICE

(75) Inventors: Yasuyuki Higashiura, Inagi (JP); Takumi Kishino, Inagi (JP); Shinichi Eguchi, Inagi (JP); Masaki Watanabe, Kawasaki (JP); Toshio Endoh, Kawasaki (JP); Yutaka Katsumata, Kawasaki (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 1075 days.

(21) Appl. No.: 11/063,735

(22) Filed: Feb. 24, 2005

(65) Prior Publication Data
US 2006/0080547 A1    Apr. 13, 2006

(30) Foreign Application Priority Data
Oct. 8, 2004    (JP) .............................. 2004-296974

(51) Int. Cl.
*G06F 21/00* (2006.01)
(52) U.S. Cl. .................................................... 713/186
(58) Field of Classification Search ................. 713/186
See application file for complete search history.

(56) References Cited

U.S. PATENT DOCUMENTS

| | | | |
|---|---|---|---|
| 4,993,068 A | | 2/1991 | Piosenka et al. |
| 6,957,337 B1 * | | 10/2005 | Chainer et al. ............... 713/186 |
| 2001/0034836 A1 * | | 10/2001 | Matsumoto et al. .......... 713/176 |
| 2002/0186838 A1 * | | 12/2002 | Brandys ....................... 380/30 |
| 2002/0188855 A1 * | | 12/2002 | Nakayama et al. ........... 713/186 |
| 2003/0005310 A1 * | | 1/2003 | Shinzaki ...................... 713/186 |
| 2004/0022421 A1 * | | 2/2004 | Endoh et al. ................. 382/115 |

FOREIGN PATENT DOCUMENTS

| | | |
|---|---|---|
| DE | 102 06 843 A1 | 9/2003 |
| EP | 0 864 996 A2 | 9/1998 |
| EP | 1 237 091 A1 | 9/2002 |
| JP | 10-312459 | 11/1998 |
| JP | 2000-293643 | 10/2000 |
| JP | 2004-049705 | 2/2004 |
| JP | 2004-062826 | 2/2004 |
| JP | 2004-078791 | 3/2004 |

(Continued)

OTHER PUBLICATIONS

European Search Report dated Nov. 9, 2006, Application No. 05251674.7-2218.

(Continued)

*Primary Examiner*—Nasser Moazzami
*Assistant Examiner*—Michael S McNally
(74) *Attorney, Agent, or Firm*—Westerman, Hattori, Daniels & Adrian, LLP

(57) ABSTRACT

A biometrics authentication device uses biometrics information to perform individual authentication. Primary and secondary verification of biometrics characteristic data from an image capture device are performed by a control unit and IC card. The biometrics character data is scrambled and transmitted between devices. The second registration data which is more important to authentication is stored within the IC card, and first registration data is registered in the IC card in a scrambled state. Security is improved, and moreover the load on the CPU of the IC chip in the IC card is reduced.

10 Claims, 18 Drawing Sheets

FOREIGN PATENT DOCUMENTS

| | | | |
|---|---|---|---|
| WO | WO 01/43338 | * | 6/2001 |
| WO | WO 02/37403 | * | 5/2002 |
| WO | WO 0237403 A1 | * | 5/2002 |
| WO | WO 2004-021884 | | 3/2004 |
| WO | WO2004/021884 A1 | | 3/2004 |

OTHER PUBLICATIONS

Chinese Office Action dated Mar. 30, 2007, Application No. 200510059448.1.

* cited by examiner

VEIN IMAGE N1

|   | 0 | 1 | 2 | 3 | 4 |
|---|---|---|---|---|---|
| 0 | 255 | 255 | 0 | 255 | 255 |
| 1 | 255 | 255 | 0 | 0 | 0 |
| 2 | 255 | 255 | 0 | 255 | 0 |
| 3 | 0 | 0 | 255 | 0 | 0 |
| 4 | 0 | 0 | 0 | 255 | 0 |

VEIN IMAGE N2

|   | 0 | 1 | 2 | 3 | 4 |
|---|---|---|---|---|---|
| 0 | 255 | 255 | 0 | 0 | 255 |
| 1 | 255 | 255 | 255 | 0 | 0 |
| 2 | 255 | 255 | 0 | 255 | 255 |
| 3 | 0 | 0 | 255 | 255 | 0 |
| 4 | 0 | 0 | 0 | 255 | 255 |

FIG. 21  PRIOR ART
REGISTERED IMAGE
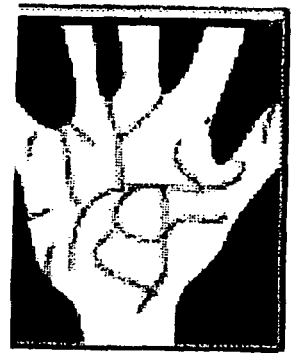
VERIFICATION IMAGE
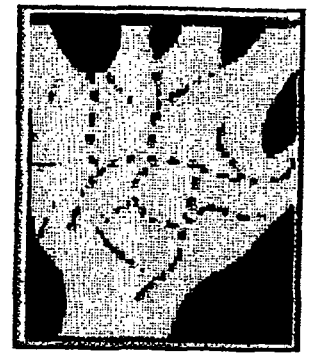
FIG. 22  PRIOR ART
REGISTERED IMAGE
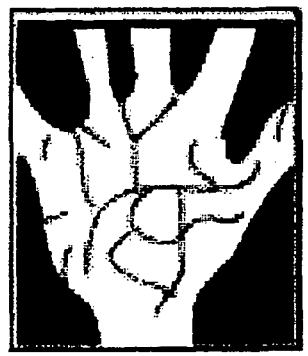
VERIFICATION IMAGE
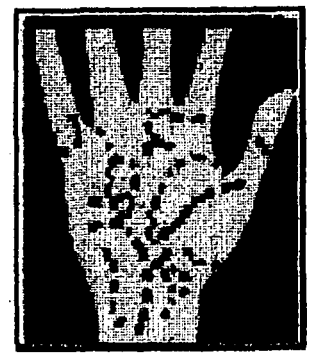

BIOMETRICS AUTHENTICATION METHOD AND BIOMETRICS AUTHENTICATION DEVICE

CROSS-REFERENCE TO RELATED APPLICATIONS

This application is based upon and claims the benefit of priority from the prior Japanese Patent Application No. 2004-296974, filed on Oct. 8, 2004, the entire contents of which are incorporated herein by reference.

BACKGROUND OF THE INVENTION

1. Field of the Invention

This invention relates to a biometrics authentication method and biometrics authentication device to authenticate individuals using features of a portion of the human body, and in particular relates to a biometrics authentication method and biometrics authentication device suitable for verifying registered blood vessel image information for a body part against blood vessel information detected for a body part, in a contactless manner.

2. Description of the Related Art

In the human body there are numerous parts which can be used to differentiate individuals, such as fingerprints of hand and toe, the retinas of the eyes, facial features, and blood vessel patterns. Advances in biometrics technology in recent years have been accompanied by proposals of various devices which identify biometrics characteristics which are such regions of the human body to authenticate individuals.

Of these, because blood vessels and pin the palms and fingers and palm prints provide a comparatively large quantity of individual characteristic data, they are suited to individual authentication where high reliability is required. In particular, the patterns of blood vessels (veins) remain unchanged from the fetus throughout life, and are thought to be completely unique, and so are suited to individual authentication. FIG. 19 through FIG. 22 explain conventional technology for authentication using the palm. As shown in FIG. 19, at the time of registration or authentication, the user brings the palm of a hand 110 close to an image capture device 100. The image capture device 100 emits near-infrared rays, which are incident on the palm of the hand 110. The image capture device 100 receives the near-infrared rays reflected from the palm of the hand 110 using a sensor.

As shown in FIG. 20, hemoglobin within the red corpuscles flowing in the veins 112 has lost oxygen. This hemoglobin (reduced hemoglobin) absorbs near-infrared rays at wavelengths near 760 nanometers. Consequently when near-infrared rays are made incident on the palm of a hand, reflection is reduced only in the areas in which there are veins, and the intensity of the reflected near-infrared rays can be used to identify the positions of veins.

As shown in FIG. 19, a user first registers in a server and card the vein image data for the palm of his own hand, using the image capture device 100 of FIG. 19. Next, in order to perform individual authentication, the user uses the image capture device 100 of FIG. 19 to cause the vein image data of his own palm to be read.

The individual is authenticated by comparing the patterns of veins in the registered vein image retrieved using the user's ID and in the vein verification image read by the image capture device 100. For example, on comparing the vein patterns in the registered image and a verification image as in FIG. 21, the individual is authenticated as the individual in question. On the other hand, upon comparison of the vein patterns in a registered image and in a verification image as in FIG. 22, the individual is not authenticated (see for example Japanese Patent Laid-open No. 2004-062826).

In a biometrics authentication system, measures must be taken to ensure that biometrics characteristic data is not leaked to outside parties. Hence in the field of fingerprint authentication, a method of individual authentication has been proposed in which fingerprint characteristic data for an individual is registered in an IC card, and fingerprint characteristic data read from a fingerprint sensor is verified against the data within the IC card (Japanese Patent Laid-open No. 2000-293643).

Further, in the above proposal, the IC card stores comparatively low-level characteristic data A (which may be leaked to outside parties), and comparatively high-level characteristic data B which should be kept confidential, taking into consideration the processing capacity of the IC cards. Characteristic data A is transmitted from the IC card to an external device including a fingerprint sensor, and in the external device verification with the characteristic data A (called "primary verification") is performed. The verification result and characteristic data B' extracted from an image from the fingerprint sensor are transmitted to the IC card, and within the IC card verification with the characteristic data B (called "secondary verification") is performed.

In this method, two stage verification operations are performed, externally and in the IC card, so that high-speed authentication can be achieved while maintaining security of biometrics characteristic data.

However, in order to further prevent leakage of characteristic data, security measures should also be applied to communication between the sensor, external device, and the IC card. In the above-described technology of the prior art, at the time of registration of characteristic data A, B in the IC card from the external device, data is encrypted and transmitted, and is decrypted and stored in the IC card (Japanese Patent Laid-open No. 2000-293643, paragraph 0055). And to perform secondary verification, characteristic data B' is encrypted and transmitted from the external device to the IC card, and is decrypted and used in secondary verification in the IC card (Japanese Patent Laid-open No. 2000-293643, paragraphs 0061, 0062).

However, in the technology of the prior art, no security measures are taken with respect to biometrics information sent from the sensor to the external device at the times of registration and verification. Consequently there are respects in which protection of biometrics information detected by the sensor is lacking. And because characteristic data A which may be released externally is also encrypted, the IC card has had to bear the substantial processing burden of decrypting the characteristic data A and B.

SUMMARY OF THE INVENTION

Hence an object of this invention is to provide an authentication processing method for a biometrics authentication device and a biometrics authentication device which reduce the load on the IC card while further improving the security of biometrics information.

A further object of the invention is to provide an authentication processing method for a biometrics authentication device and a biometrics authentication device which effectively utilize the processing functions of an external device to reduce the load on the IC card while further improving the security of biometrics information.

Still another object of the invention is to provide an authentication processing method for a biometrics authentication device and a biometrics authentication device which reduce the load on the IC card while further improving the security of complex biometrics information.

In order to achieve these objects, a biometrics authentication device of this invention detects and registers biometrics characteristic data from a body part, captures an image of the above body part, detects the above biometrics characteristic data from the captured image, verifies the characteristic data against the above registered characteristic data, and performs individual authentication. The device has an image capture device, which captures images of the above body part, and scrambles and transmits the images; an IC card reader/writer, which reads and writes IC cards storing comparatively coarse first biometrics characteristic data and comparatively fine second characteristic data of a user; and a control unit which performs verification processing. The above control unit descrambles the above scrambled captured image, receives scrambled first characteristic data from the above IC card, performs primary verification of the above captured image and the above first characteristic data, creates final verification data, and scrambles and transmits the above final verification data to the above IC card. The above IC card descrambles the above final verification data, and performs secondary verification with the above stored second characteristic data.

In this invention, it is preferable that the above control unit aligns the above captured image and the above first characteristic data and create the above final verification data from the captured image.

In this invention, it is preferable that at the time of registration of the above characteristic data, the above control unit descramble the above scrambled captured image from the image capture device, create the comparatively coarse first biometrics characteristic data and the comparatively fine second characteristic data for the above user from the above unscrambled captured image, scramble and transmit to the above IC card the above first biometrics characteristic data, and transmit to the above IC card the above encrypted second characteristic data. And the above IC card decrypt and store the above encrypted second characteristic data.

In this invention, it is preferable that the above control unit scramble the above final verification data and transmit the data to the above IC card reader/writer, and that at the above IC card reader/writer the above scrambled final verification data be encrypted and transmitted to the above control unit.

In this invention, it is preferable that the above image capture device is constructed of a unit for image capture of blood vessel images of the above user, that the above first characteristic data be comparatively coarse characteristic data of the above blood vessel images, and that the above second characteristic data be comparatively fine characteristic data of the above blood vessel images.

In this invention, even through primary and second verification are performed by different units, because data is scrambled and transmitted, and moreover registration data B of importance for authentication is stored within IC card while registration data A is registered in IC card in a scrambled state, descrambling processing need not be performed by the IC card. Because processing performed within the IC card is descrambling of final verification data and verification, security is further improved, while keeping the load on the CPU of the IC chip in the IC card low.

BRIEF DESCRIPTION OF THE DRAWINGS

FIG. 21 explains conventional palm authentication technology; and,

FIG. 22 further explains conventional palm authentication technology.

DESCRIPTION OF THE PREFERRED EMBODIMENTS

Below, embodiments of the invention are explained in the order of a biometrics authentication system, biometrics authentication processing, biometrics characteristic data registration processing, biometrics characteristic data authentication processing, and other embodiments.

Biometrics Authentication System

Figure 1:
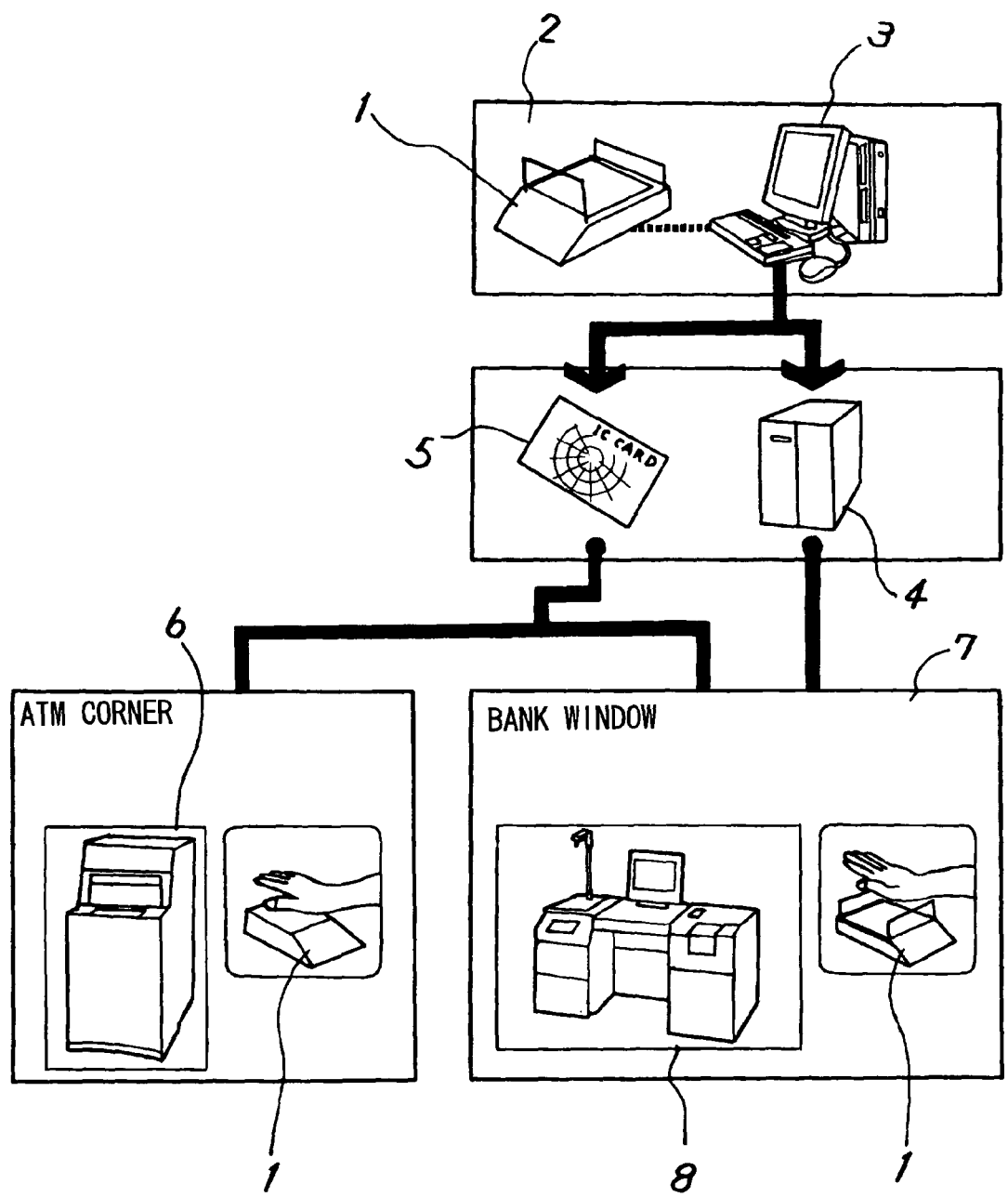
FIG. 1 shows the configuration of a biometrics authentication system of one embodiment of the invention.
Figure 2:
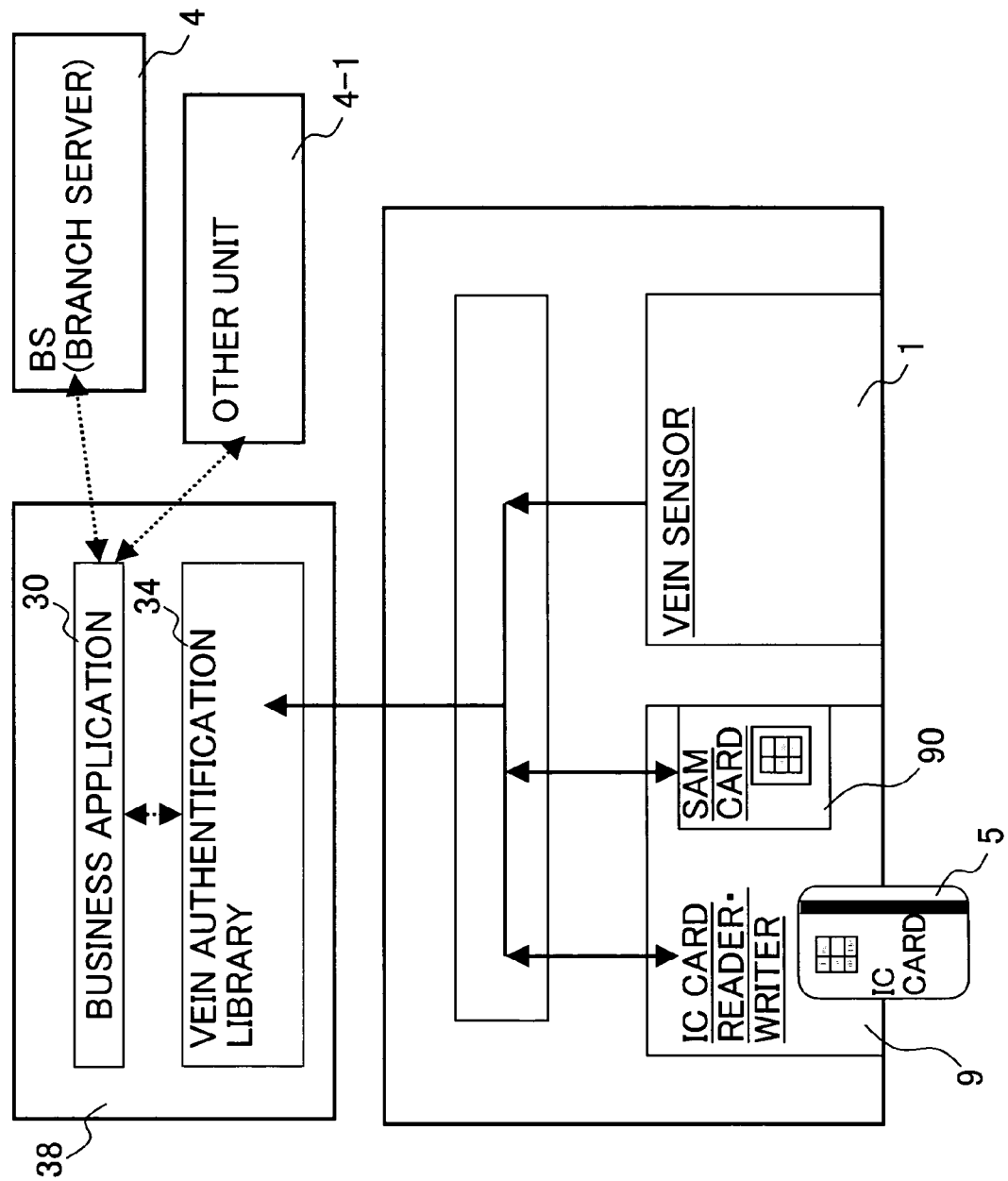
FIG. 2 shows the configuration of the bank window device of FIG. 1.
Figure 3:
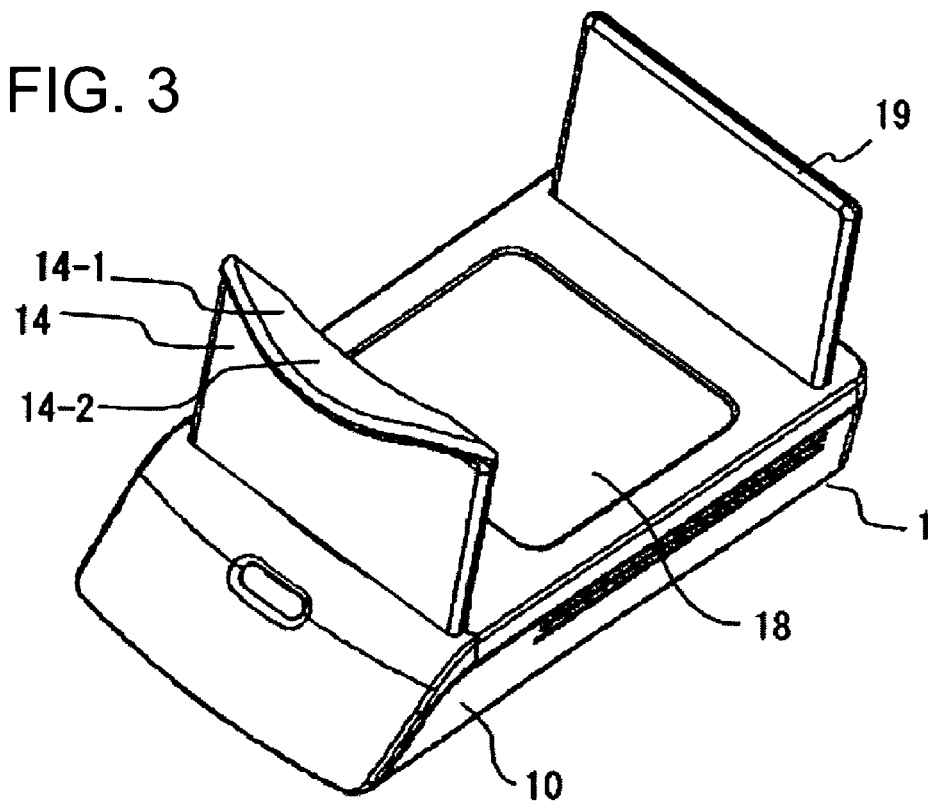
FIG. 3 is an external view of the image capture device of FIG. 1.
Figure 4:
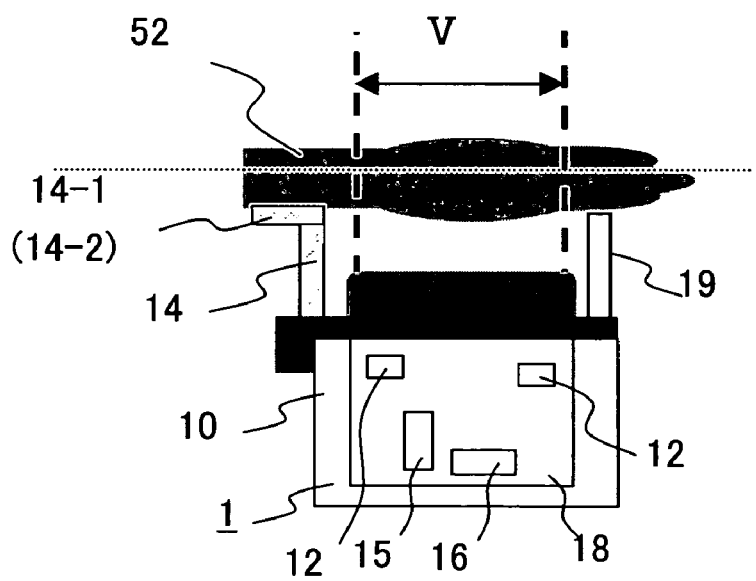
FIG. 4 shows the configuration of the image capture device of FIG. 3.
Figure 5:
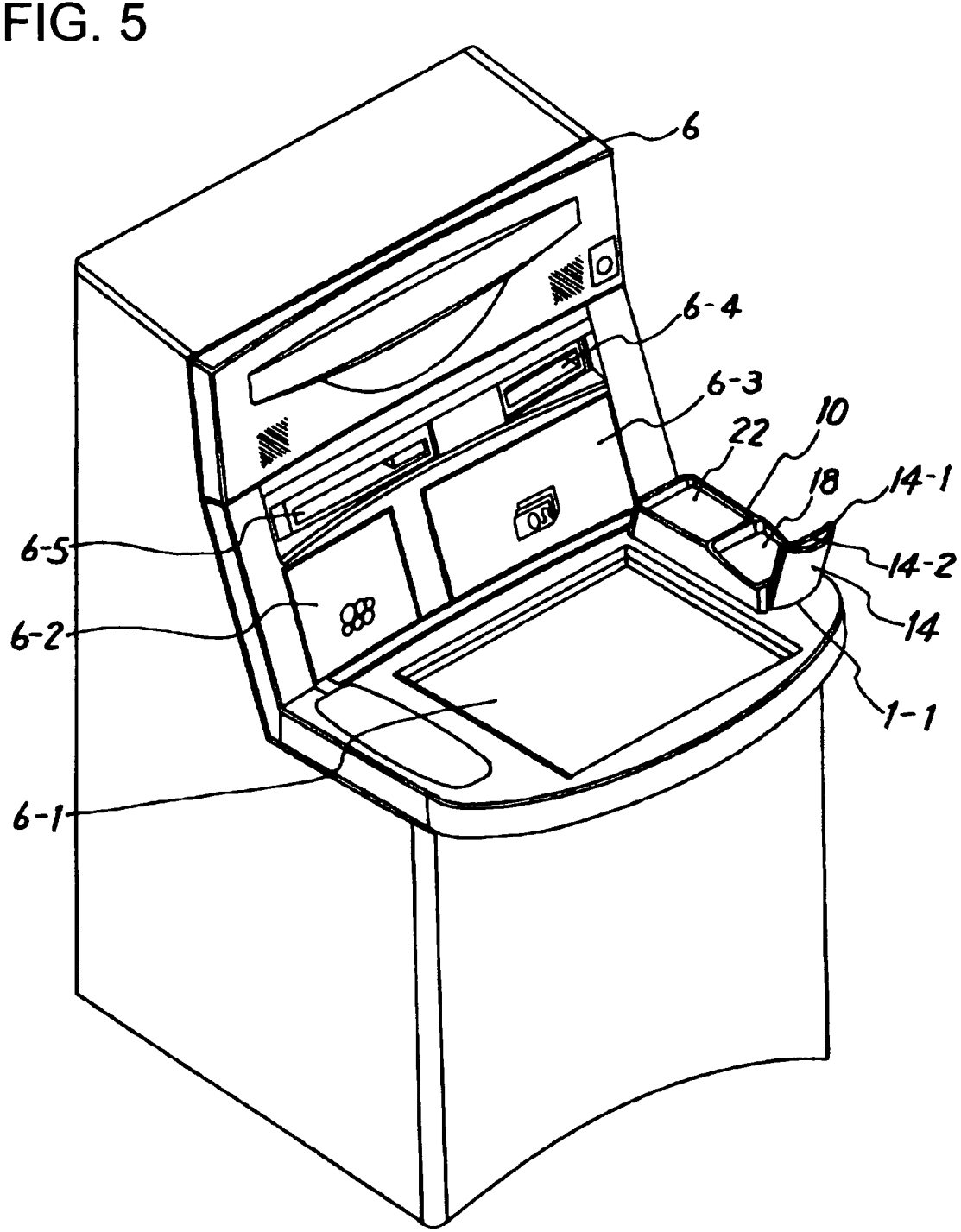
FIG. 5 is an external view of the ATM of FIG. 1.
Figure 6:
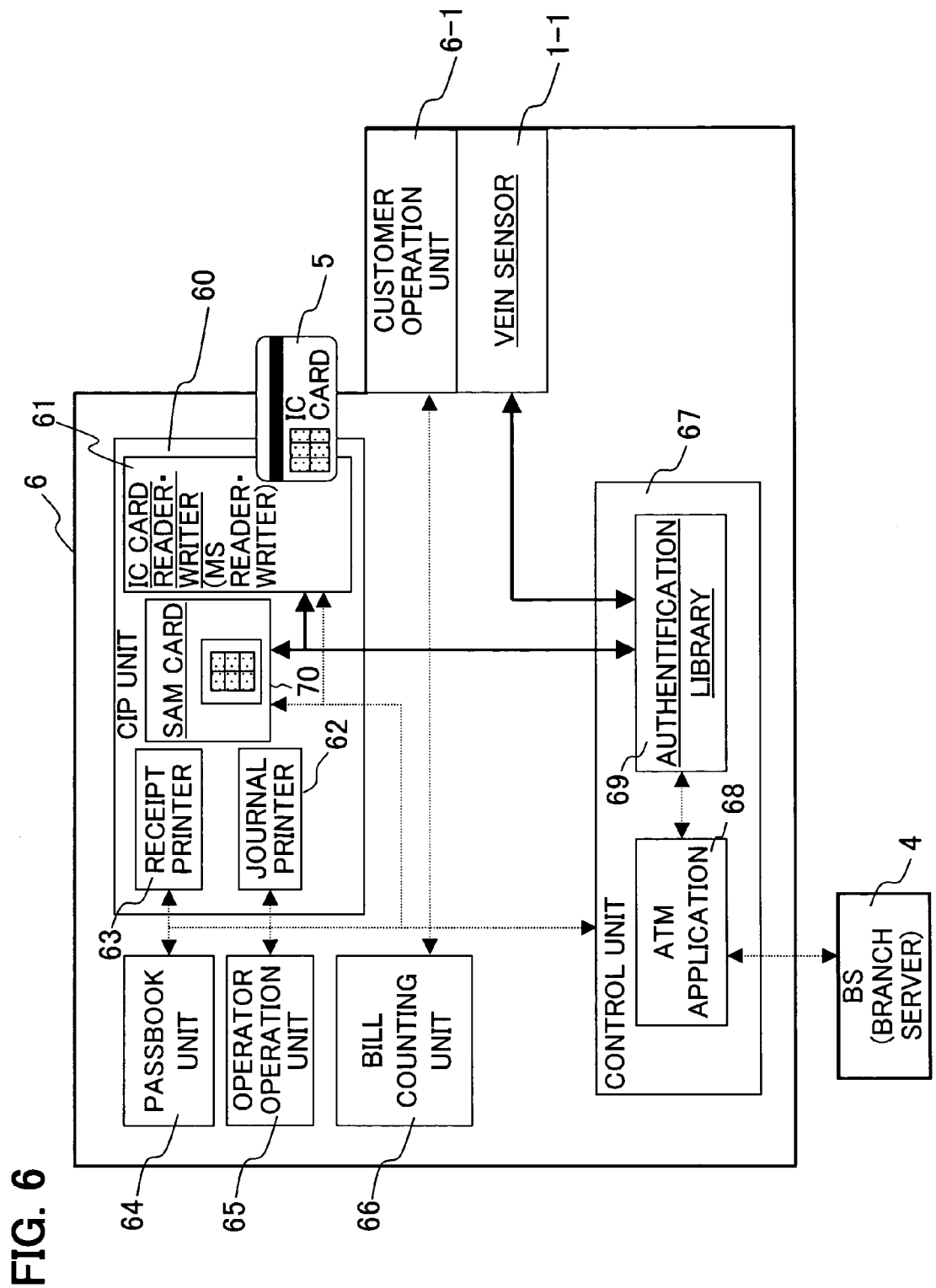
FIG. 6 is a block diagram of the ATM of FIG. 5.

FIG. 1 shows the configuration of a biometrics authentication system of one embodiment of the invention, FIG. 2 shows the configuration of the business terminal device/bank window device of FIG. 1, FIG. 3 is an external view of the palm image capture device of FIG. 1 and FIG. 2, FIG. 4 shows the configuration of the image capture device of FIG. 3, FIG. 5 is an external view of the automated transaction machine of FIG. 1, and FIG. 6 shows the configuration of the automated transaction machine of FIG. 5.

FIG. 1 shows a palm vein pattern authentication system in a financial institution, as an example of a biometrics authentication system. A palm image capture device 1 explained in FIG. 3 and a branch office terminal (for example, a personal computer) 3 connected thereto are provided in the bank window area 2 of the financial institution. A user requesting vein pattern authentication places his hand over the palm image capture device (hereafter called the "image capture device")

1. The image capture device 1 reads the palm image, and blood vessel extraction processing in the terminal device 3 extracts the vein pattern, and this pattern is registered as vein data in the terminal device 3.

This vein data is stored in the storage area 4a of a database server 4 connected to the terminal device 3 and in an individual card (for example, an IC card) 5 held by the user. The server 4 is connected to the bank window terminal device 8 of the bank window area 7 of the financial institution, and the bank window terminal device 8 is connected to the image capture device 1.

In order to make a withdrawal or perform some other financial transaction at the bank window area 7 of the financial institution, the user inserts an IC card 5 into the IC card reader explained in FIG. 2, and places his hand over the image capture device 1 provided in the bank window area 7. The image capture device 1 reads the palm image, and blood vessel image extraction processing by the window terminal device 8 extracts the vein pattern. Verification processing by the window terminal device 8 verifies this vein pattern, as vein data, against the vein data registered in the IC card 5 to authenticate the individual.

The server 4 can be connected to an ATM (automated cash insertion/dispensing machine) 6 of the financial institution, and the transactions through vein authentication is performed by the ATM 6. When a user employs the ATM 6 to make a withdrawal or perform some other financial transaction, the user places his hand over the image capture device 1-1 provided in the ATM 6. The image capture device 1-1 reads the palm image. Similarly to the window terminal device 8, the ATM 6 extracts the vein pattern (blood vessel image), verifies this, as vein data, against the vein data registered in the IC card 5 held by the user, and authenticates the individual.

FIG. 2 and FIG. 3 show the configurations of the service/window terminal devices 3, 8 of FIG. 1. As shown in FIG. 2, the terminal devices 3 and 8 is mounted an application 30 and a vein authentication library (program) 34. A vein sensor (palm image capture device) 1 and IC card reader/writer 9 are connected to the terminal devices 3 and 8.

The IC card reader/writer 9 reads and writes the IC chip and magnetic strip of the IC card 5 of a user. A security access module (SAM) is provided in the IC card reader/writer 9, and the module permits only authenticated access, to maintain the security of the IC card 5.

As shown in FIG. 3, the palm image capture device 1-1 of FIG. 1 and FIG. 2 has a sensor unit 18 mounted substantially in the center of the main unit 10. The front guide 14 is provided in the front portion (on the user side) of the sensor unit 18, and the rear guide 19 is provided in the rear portion. The front guide 14 is constructed of a sheet of transparent or substantially transparent synthetic resin.

The front guide 14 serves the purposes of guiding the hand of the user in the front and of supporting the wrist. Hence above the sensor unit 18, the front guide 14 aids the user by guiding the wrist, and also supports the wrist. As a result, the attitude of the palm above the sensor unit 18, that is, the position, inclination, and size can be regulated above the sensor unit 18. The cross-sectional shape of the front guide 14 has a vertical body and, in the top portion, a horizontal portion 14-1 to support the wrist. A depression 14-2 is formed continuously in the center of the horizontal portion 14-1, to facilitate positioning of the wrist. The rear guide 19 serves to support the fingers.

As shown in FIG. 4, the sensor unit 18 is provided with an infrared sensor (CMOS sensor) and focusing lens 16, and with a distance sensor 15 in the center, and on the periphery thereof with a plurality of near-infrared light-emitting elements (LEDs) 12. For example, near-infrared LEDs are provided in eight places on the periphery, to emit near-infrared rays upwards.

The readable region V of this sensor unit 18 is regulated by the relation between the sensor, focusing lens, and near-infrared light emission region. Hence the position and height of the front guide 14 are set such that the supported wrist is positioned in the readable region V.

When the hand 52 is extended with palm flat, the palm has maximum area, and moreover is flat, so that when the palm is subjected to image capture in the image capture region V of the sensor unit 18, an accurate vein pattern which can be used in registration and verification is obtained. When the distance from the sensor unit 18 to the palm is within a prescribed range, a sharp, focused image is obtained by the sensor 16 of the sensor unit 18.

Hence as shown in FIG. 4, by supporting the wrist 52 with the front guide 14 above the sensor unit 18, the front guide 14 can guide and support the user's hand so that the position, inclination and height of the palm above the sensor unit 18 are made precise with respect to the image capture range of the sensor unit 18.

Next, the automated transaction machine (ATM) of FIG. 1 is explained. As shown in FIG. 5, the ATM 6 has, on the front face thereof, a card insertion/ejection inlet 6-4; a bankbook insertion/ejection inlet 6-5; a paper currency insertion/dispensing inlet 6-3; a coin insertion/dispensing inlet 6-2; and a user operation panel 6-1 for operation and display.

In this example, the image capture device 1-1 is provided on the side of the user operation panel 6-1. The sensor unit 18 explained in FIG. 4 is mounted on the forward side of the main unit 10 of the image capture device 1. On the forward portion (on the user side) of the sensor unit 18 is provided a front guide 14. The front guide 14 is constructed of a sheet of synthetic resin, transparent or substantially transparent. In order to serve the purposes of guiding the hand of the user in the front and of supporting the wrist, the cross-sectional shape of the front guide 14 has a vertical body and, in the top portion, a horizontal portion 14-1 to support the wrist. A depression 14-2 is formed continuously in the center of the horizontal portion 14-1, to facilitate positioning of the wrist.

Further, the sensor unit 18 of the main unit 10 faces rearward and is inclined upward, and a flat portion 22 is provided therebehind.

As shown in FIG. 6, the ATM 1 has a CIP (Card Reader Printer) unit 60 having a card insertion/ejection inlet 6-4; a bankbook unit 64 having a bankbook insertion/ejection inlet 6-5; a paper currency/coin counting unit 66 having a paper currency insertion/dispensing inlet 6-3 and a coin insertion/dispensing inlet 6-2; an attendant operation portion 65; a control unit 67; a user operation panel 6-1 (UOP) for operation and display; and an image capture device (vein sensor) 1-1.

The CIP unit 60 has an IC card reader/writer 61 which reads and writes the magnetic stripe and IC tip of an IC card 5; a receipt printer 63 which records transactions on a receipt; a journal printer 62 which prints the history of transaction on journal forms; and a security access module (SAM) 70.

The bankbook unit 64 prints transactions on pages of a bankbook, and when necessary turns the pages. The attendant operation portion 65 is for operations by an attendant, who can perform operations upon occurrence of a fault or during inspections according to status display. The paper currency/coin counting unit 66 differentiates, counts, and stores inserted paper currency and coins, and counts and dispenses paper currency and coins in the required quantities.

The control unit 67 communicates with the server 4, and has an ATM application 68 which controls ATM operation and an authentication library (program) 69 for authentication processing. A portion of this ATM application 68 controls biometrics authentication guidance screens of the UOP (user operation panel) 6-1 in connection with the authentication library 69.

Biometrics Authentication Processing Method

Figure 7:
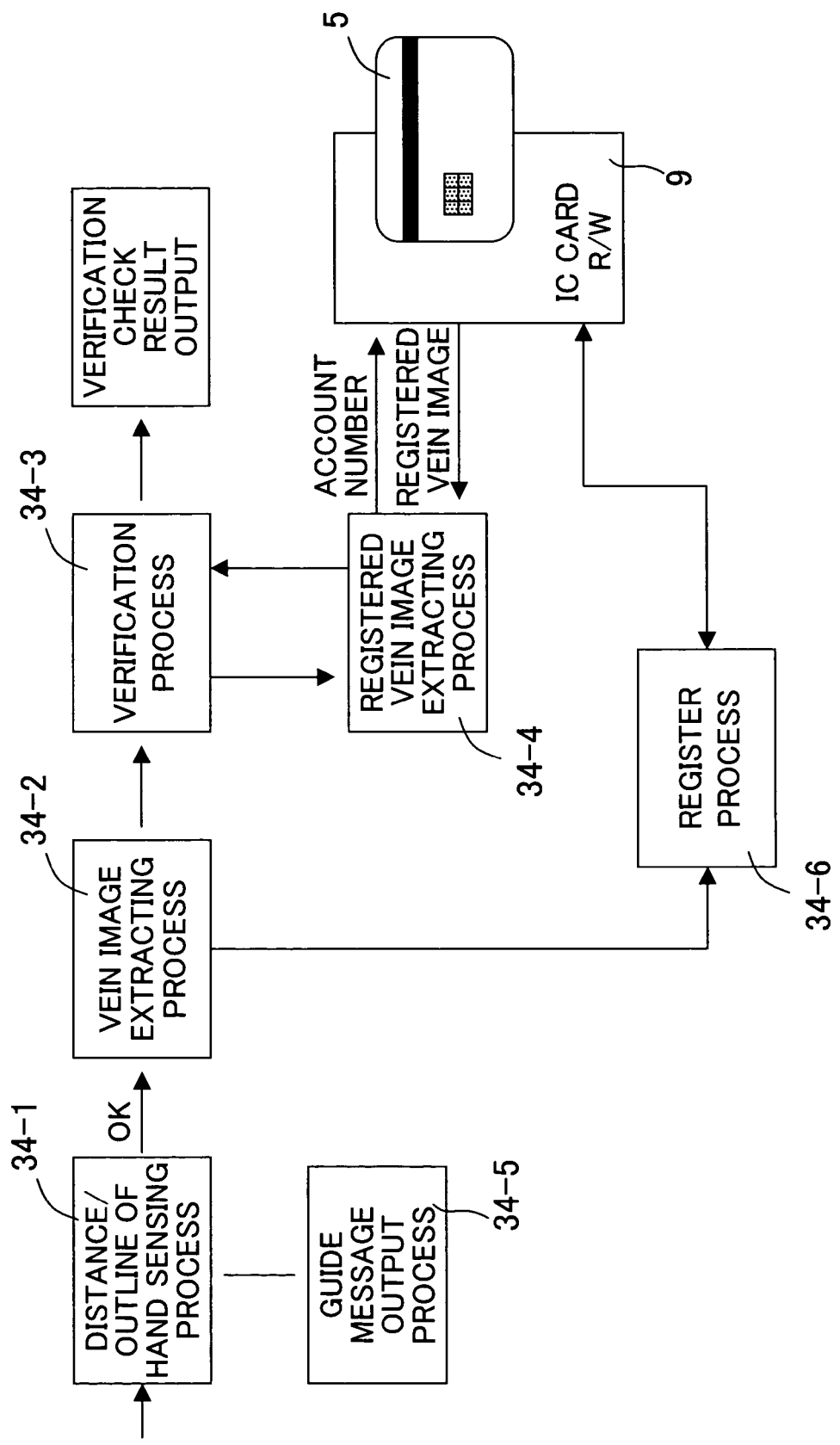
FIG. 7 is a functional block diagram of biometrics information registration/verification processing in one embodiment of the invention.
Figures 8, 9:
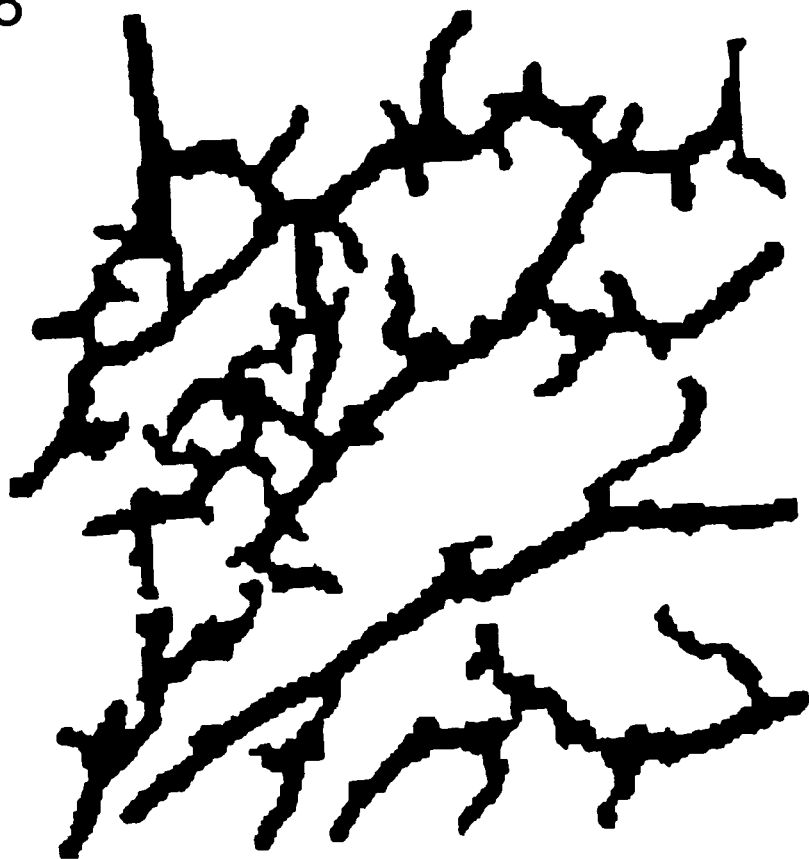
FIG. 8 explains the blood vessel image of FIG. 7.
FIG. 9 explains the blood vessel image data of FIG. 8.

FIG. 7 is a block diagram of BIOMETRICS authentication processing in one embodiment of the invention, FIG. 8 explains the detected blood vessel image in FIG. 7, and FIG. 9 explains verification processing in FIG. 7.

As shown in FIG. 7, the authentication library 34 of the service/window terminal devices 3, 8 connected to the image capture device 1 execute a series of registration and verification processing 34-1 to 34-5. The authentication library 69 of the control portion 67 in the ATM 6 execute similar processing. The service/window terminal devices 3, 8 and the control portion 67 of the ATM 6 have, for example, a CPU and various types of memory, interface circuitry, and other circuits necessary for data processing. The CPU executes a series of registration and verification processing 34-1 to 34-5. As explained below, the IC chip of an IC card 5 also executes verification processing 34-3.

Distance/hand outline detection processing 34-1 receives the distance measured by the distance sensor 15 from the image capture device 1-1 and judges whether the hand or other object is at a distance within a prescribed range from the sensor unit 18, and also detects the outline of the hand from the image captured by the sensor unit 18 and judges from the outline whether the image can be used in registration and verification processing. For example, the palm may not appear sufficiently in the image.

Guidance message output processing 34-5 outputs to the display of the service/window terminal devices 3, 8 a message guiding the palm of the hand leftward, rightward, forward, backward, upward or downward when the distance detected by the distance sensor 15 and the position of the hand according to outline extraction indicates that the hand or similar is outside the image capture range, and when the image captured cannot be used in registration and verification processing. By this means, the palm of the user is guided over the image capture device 1.

Figure 19:
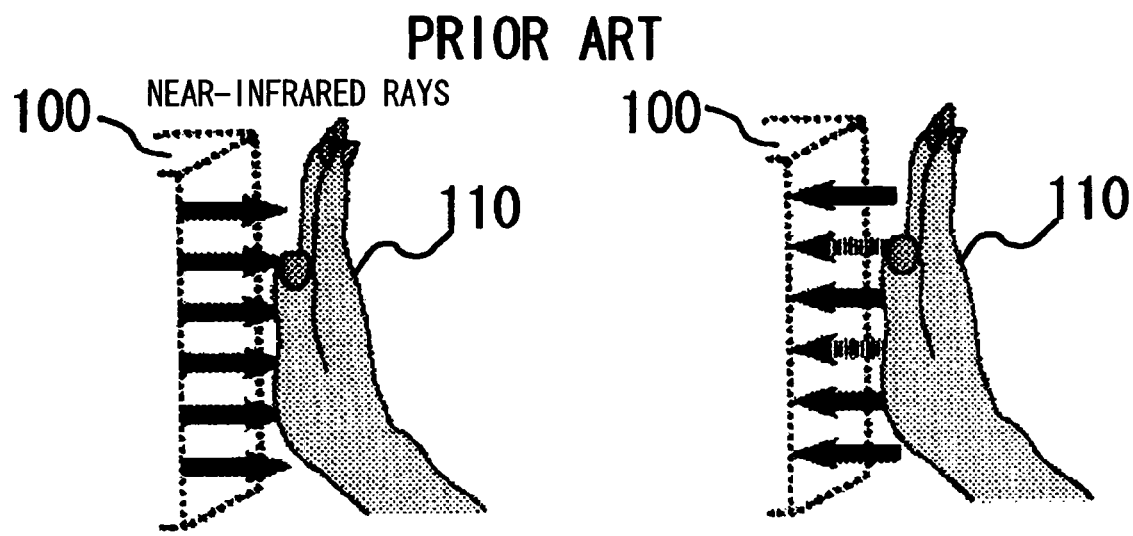
FIG. 19 explains a conventional palm image capture device.
Figure 20:
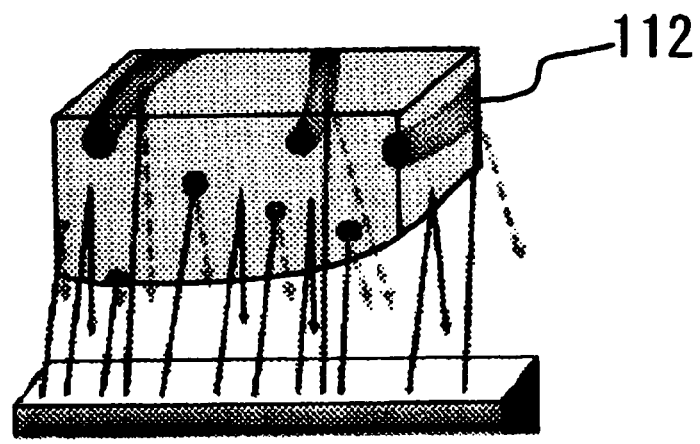
FIG. 20 explains the principle of a conventional palm image capture device.

Blood vessel image extraction processing 34-2 extracts a vein image from the image of the hand when hand outline detection processing 34-1 judges that an image has been captured with the hand held correctly. That is, as explained using FIG. 19 and FIG. 20, grayscale data of the image of the palm such as that of FIG. 9 is obtained through differences in reflectivity. The vein pattern image is an image like that shown in FIG. 8; the data is grayscale data such as that in FIG. 9. START Registered blood vessel image retrieval processing 34-4 retrieves registered blood vessel image data A, B corresponding to the individual ID (account number) from the storage portion of the IC tip in the IC card 5 shown in FIG. 1, FIG. 2 and FIG. 6. Verification processing 34-3 compares the blood vessel image data N1 detected in the blood vessel image detection processing 34-2 with the registered blood vessel image data N2 as shown in FIG. 9, performs verification processing, and outputs the verification result.

Figure 13:
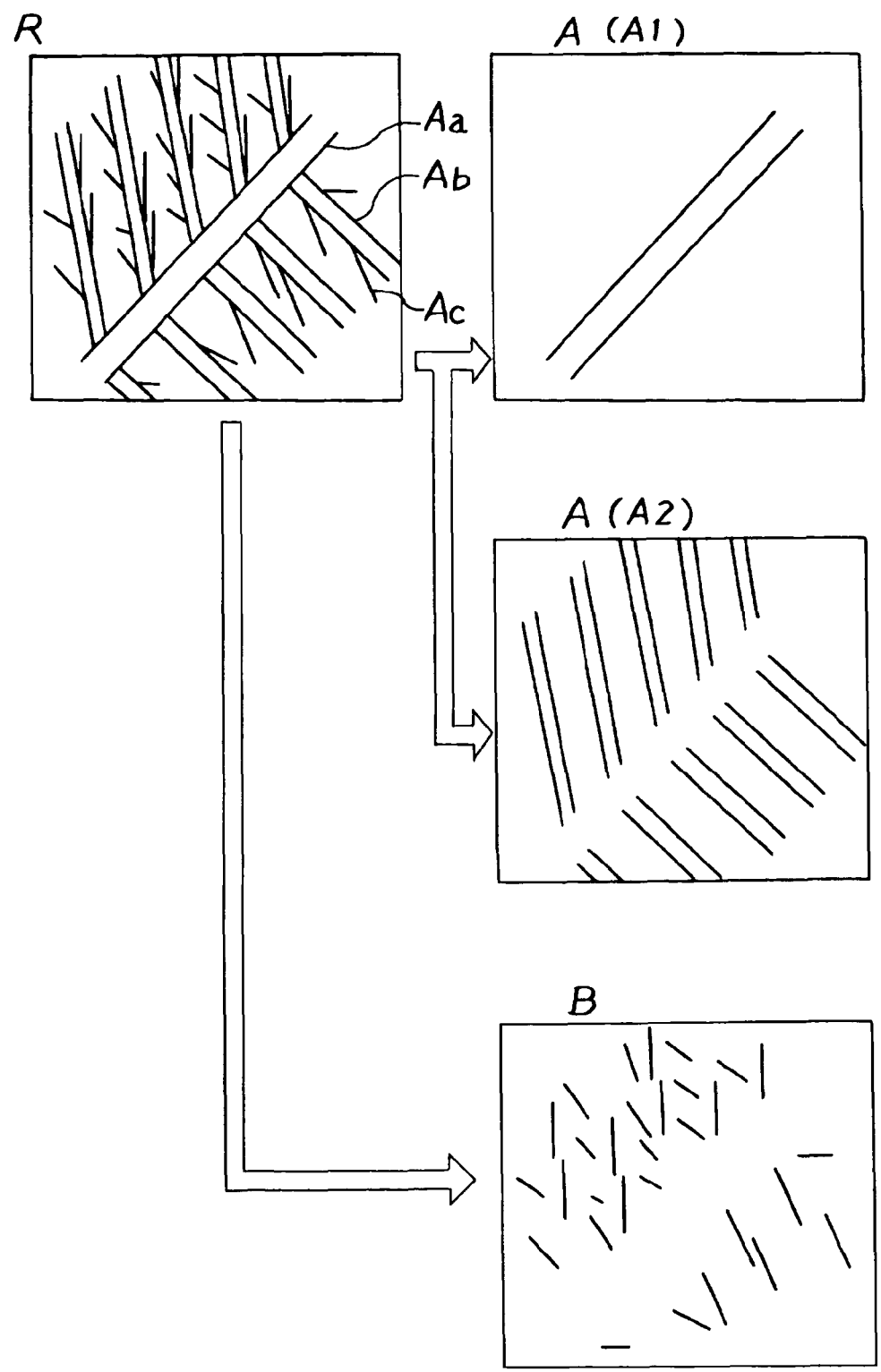
FIG. 13 explains the characteristic data A and B of FIG. 10.

Registration processing 34-5 divides the detected blood vessel image data into comparatively coarse-level blood vessel image data A and comparatively fine-level blood vessel image data B, as shown in FIG. 13, and stores the results in the IC chip 50 of the IC card 5, via the IC card reader/writer 9.

In such a blood vessel image authentication system, the simultaneous achievement of confidentiality of blood vessel image data and faster authentication processing is advantageous for rapid biometrics authentication.

Biometrics Characteristic Data Registration Processing

Figure 10:
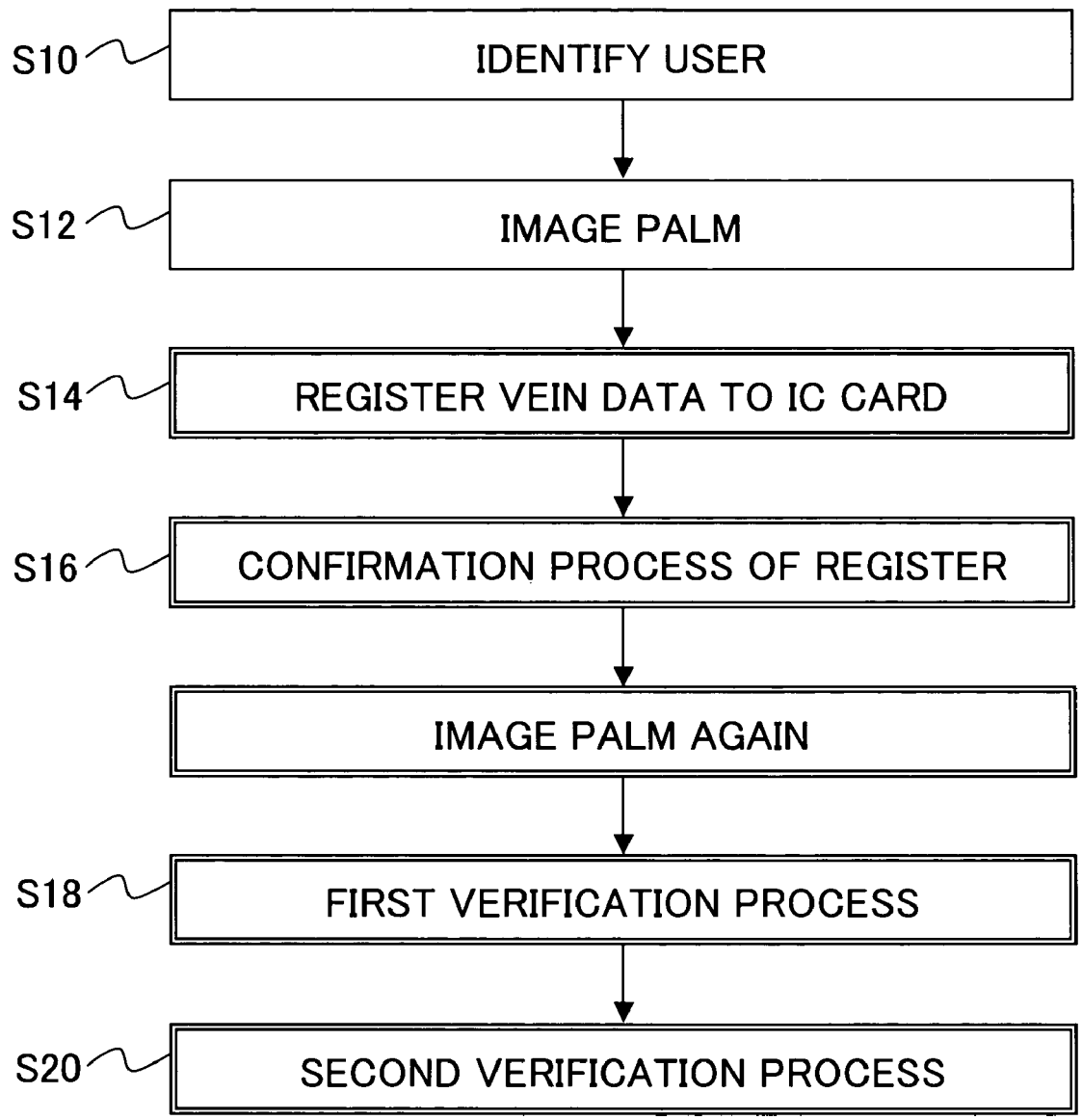
FIG. 10 is a diagram of the flow of biometrics characteristic data registration processing in one embodiment of the invention.
Figure 11:
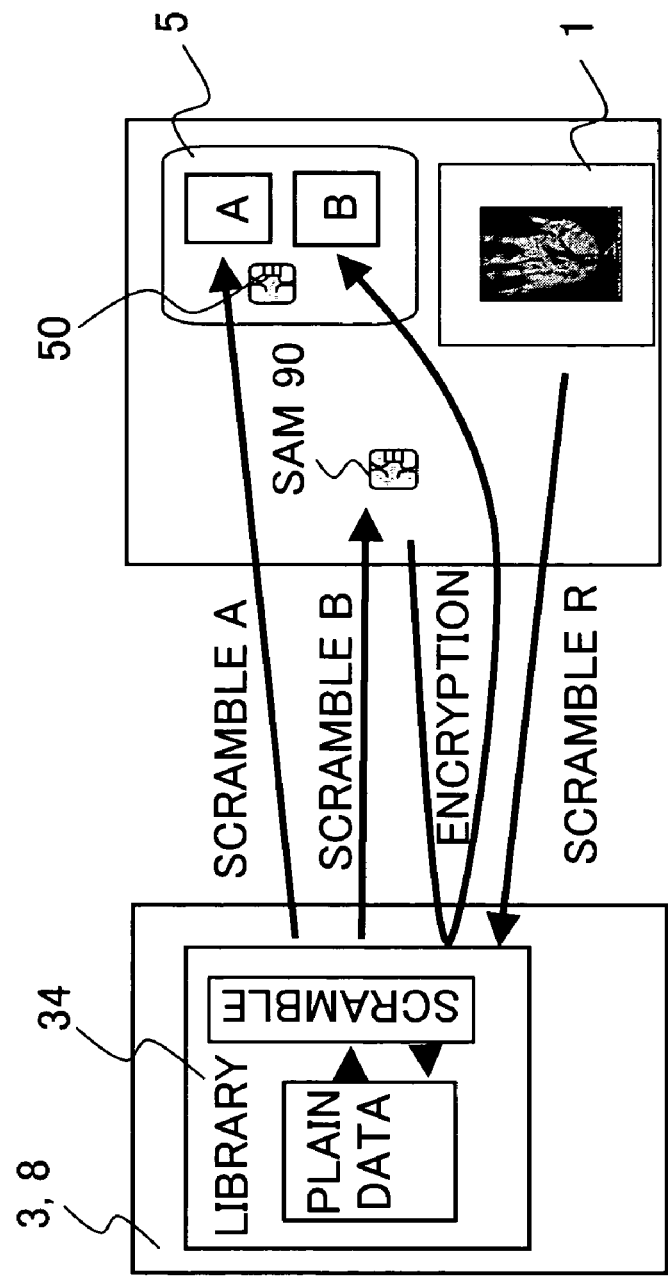
FIG. 11 shows the flow of data in the registration processing of FIG. 10.
Figure 12:
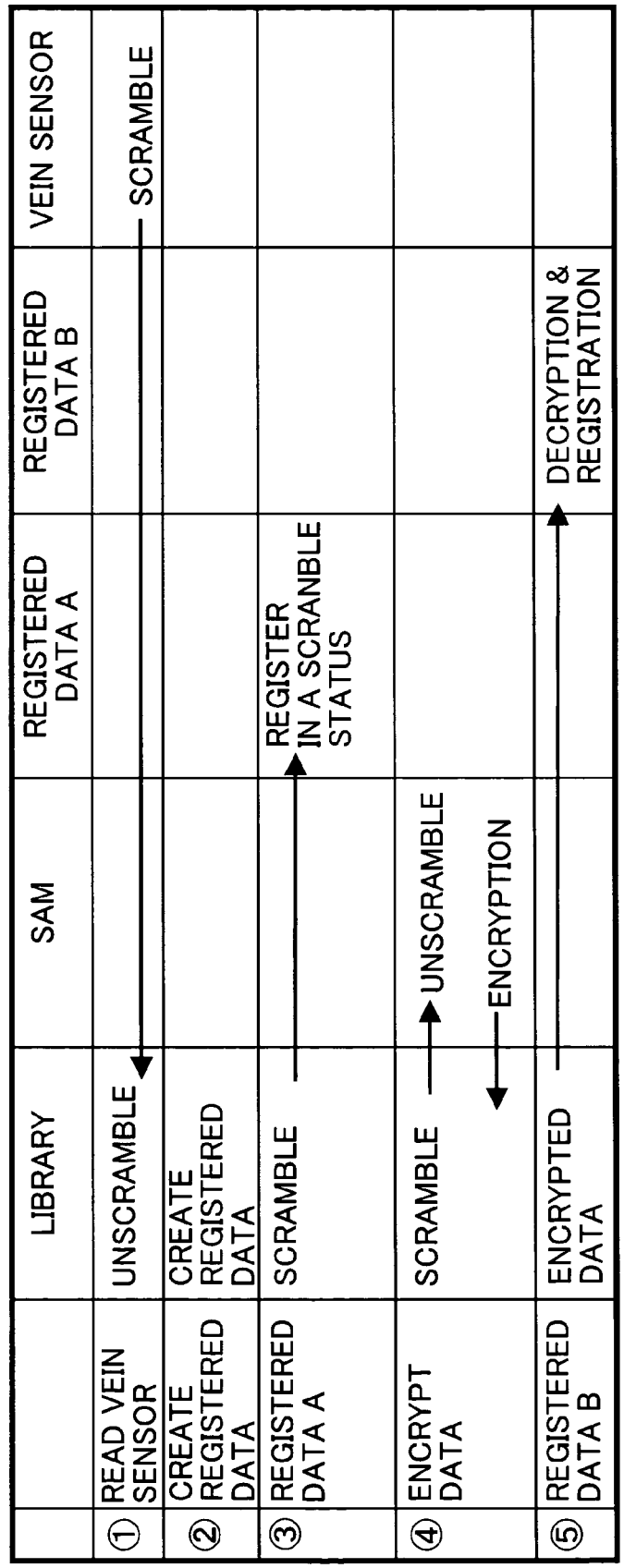
FIG. 12 explains the registration processing of FIG. 10.

Next, the biometrics characteristic data registration processing explained in FIG. 7 is explained in FIG. 10 through FIG. 13. FIG. 10 shows the flow of biometrics characteristic data registration processing in the IC card 5; FIG. 11 and FIG. 12 explain vein data registration in FIG. 10; and FIG. 13 explains the registration data A, B.

(S10) First, a user who has applied for IC card biometrics authentication presents his IC card and driver's license or other personal identification at the bank window area, and is authenticated by the issuing source of the IC card.

(S12) Upon being confirmed to be the individual in question, the user places his hand over the image capture device 1 to be captured an image of his palm.

(S14) As explained above, the registered blood vessel image data A, B is created from a captured image and is registered in the IC card 5. Registration processing is explained using FIG. 11 through FIG. 13. As shown in FIG. 11 and FIG. 12, image data (plain data) R captured by the image capture device 1 is scrambled using a prescribed algorithm, and is transmitted to the authentication libraries 34 of the service/window terminal devices 3 and 8. In the authentication libraries 34, the transmitted image data is descrambled and returned to plain data. The authentication library 34 creates the registration data A, B from the plain data R. As shown in FIG. 13, the plain data (blood vessel image data) R can be classified into trunk Aa, thick branch Ab, and fine branch Ac leading to thick branch Ab, as is seen in FIG. 8. The trunk A1 and thick branch A2 are divided into the comparatively coarse characteristic data A, and the thin branch Ac is classified as the comparatively finer characteristic data B, to create the registration data A, B. The registration data A is comparatively coarse, and so does not include finer characteristics, but indicates only rougher characteristics. The registration data B is comparatively finer, and so indicates finer characteristics.

Hence the registration data A is scrambled in the authentication library 34, and the scrambled registration data A is stored in the IC chip 50 of the IC card 5. On the other hand, the registration data B requires greater security. Therefore the data B is scrambled by the authentication library 34, and the scrambled registration data B is sent to the security access module 90 of the IC card reader/writer 9. The security access module 90 descrambles and encrypts the scramble registration data B by using a secret key. The result is sent to the authentication library 34, and from the authentication library 34, the encrypted registration data B is sent to the IC chip 50 of the IC card 5. The CPU of the IC chip 50 decrypts the data B by using the secret key, and stores the registration data B in the memory of the IC chip 50.

(S16) Next, execution proceeds to registration confirmation processing. That is, trial authentication is performed. For this purpose, the user again places his hand over the image capture device 1, to capture an image of his palm.

(S18) A series of verification (analysis and verification) operations are performed using the authentication processing of FIG. 14 and later.

(S20) Similarly, secondary verification (final verification) is performed using the authentication processing of FIG. 14 and later. As a result, the validity of registration data A and B for authentication is confirmed.

In this way data is scrambled, transmitted, and the registration data B which is more important for authentication is also encrypted. The encryption and decryption are performed not at the service/window terminals 3, 8, but on the side of the IC card reader/writer 9, so that it is difficult for the encryption key and encryption algorithm to be identified on the side of the service/window terminal devices, and security is enhanced. At the time of registration, the CPU of the IC chip 50 in the IC card 5 performs only decryption processing of registration data B, and so the load imposed is small.

Further, because trial authentication is performed, the validity of the registration data A and B can be confirmed. Upon the end of registration, the plain data is automatically erased by the authentication library 34, so that confidentiality is further improved.

Biometrics Characteristic Data Verification Processing

Figure 14:
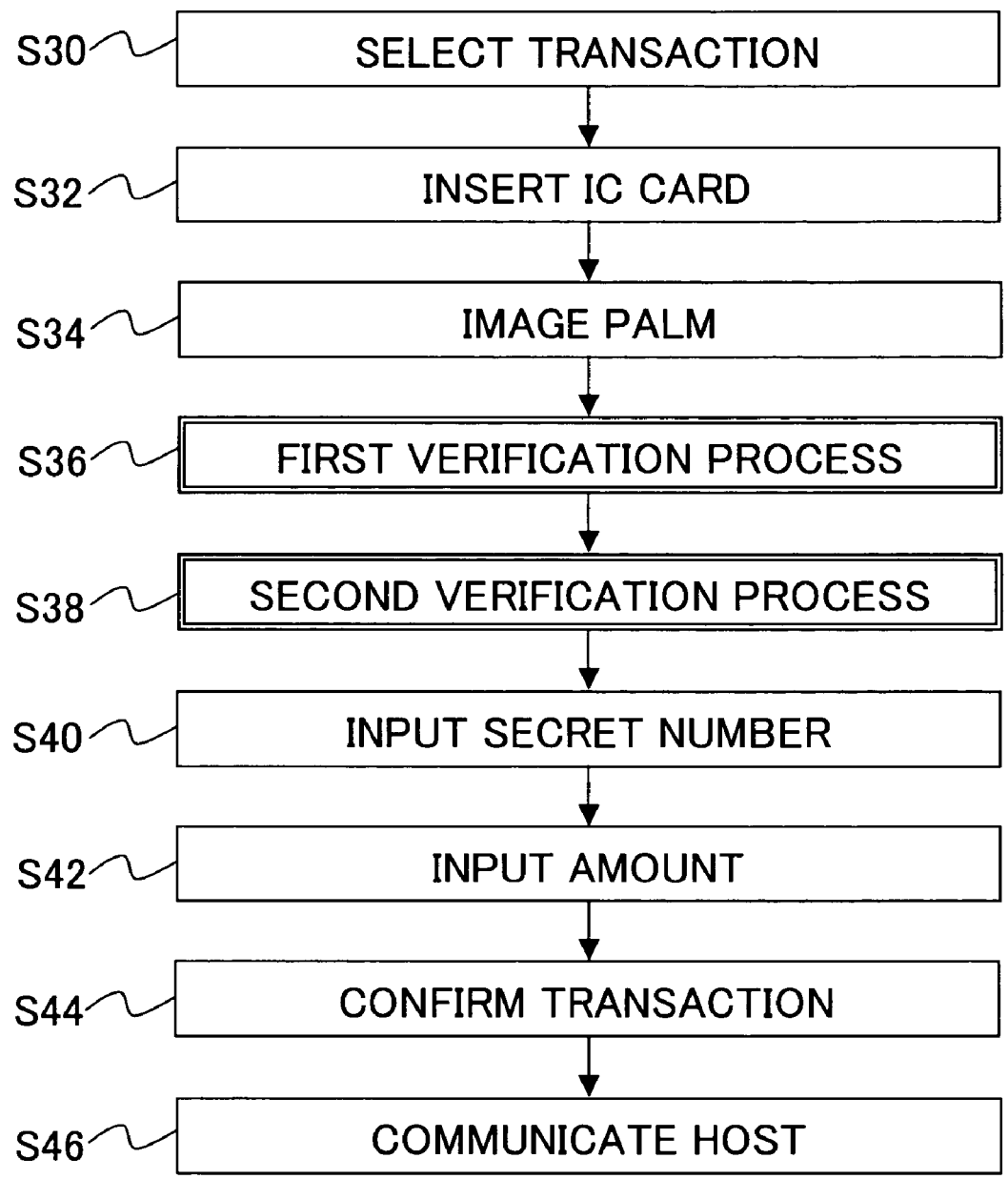
FIG. 14 is a diagram of the flow of biometrics characteristic data verification processing in one embodiment of the invention.
Figure 15:
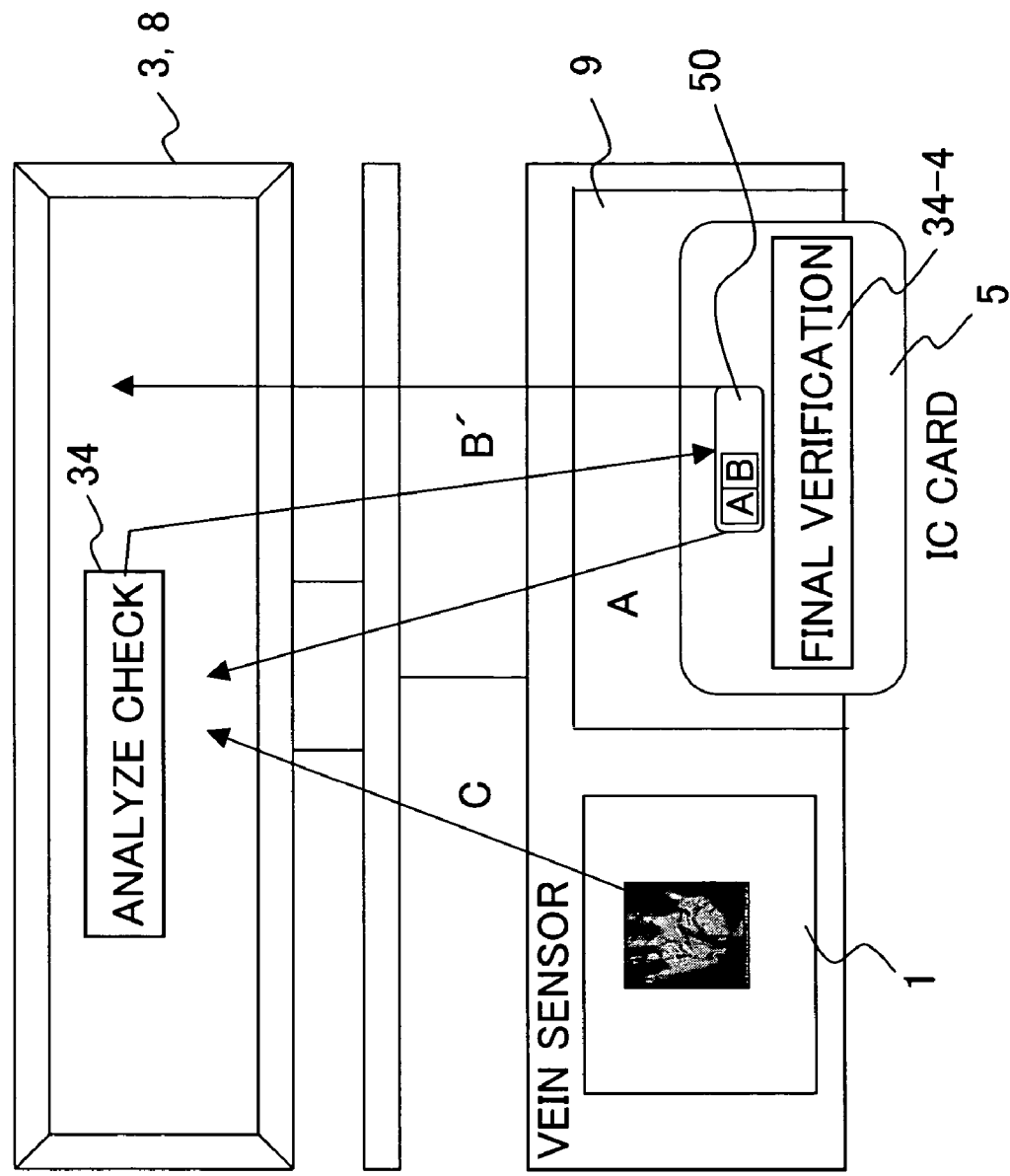
FIG. 15 shows the flow of data in the verification processing of FIG. 14.
Figure 16:
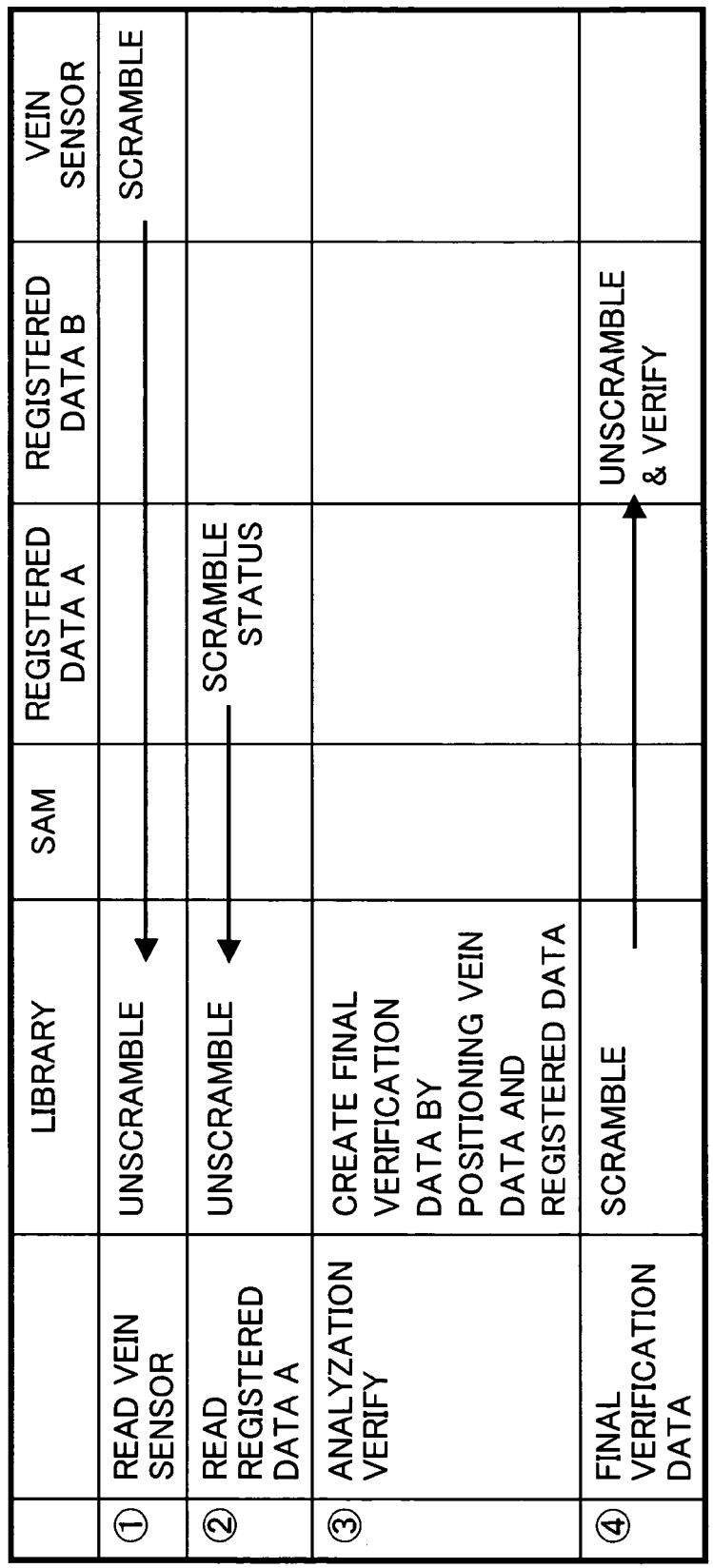
FIG. 16 explains the verification processing of FIG. 14.

Next, the biometrics characteristic data verification processing explained in FIG. 7 is further explained in FIG. 14 through FIG. 18. FIG. 14 shows the flow of transaction processing, including biometrics characteristic data verification processing using an IC card 5; FIG. 15 and FIG. 16 explain the vein data verification of FIG. 14.

(S30) First, the transaction is selected. At the window area, a user fills in a slip, and a teller performs input.

(S32) The user inserts the IC card 5 of the user into the IC card reader/writer 9, and the reader/writer 9 reads the magnetic stripe data (account number and similar) of the IC card 5.

(S34) Next, the user places his hand over the image capture device 1, and an image of the palm is captured.

(S36) Using the registration data A of the IC card 5, primary verification (analysis verification) is performed by the authentication libraries 34 of service/window terminal devices 3 and 8. That is, as shown in FIG. 15 and FIG. 16, the image data (plain data) C captured by the image capture device 1 is scrambled using a prescribed algorithm, and is transmitted to the authentication libraries 34 of the service/window terminal devices 3 and 8. At the authentication library 34, the transmitted image data is descrambled to return it to plain data. Next, the authentication library 34 reads scrambled registration data A from the IC card 5 and performs descrambling. In the example of FIG. 13, the registration data is returned to the comparatively coarse registration data A of trunks A1 and thick branches A2.

Next, the plain data and registration data A are aligned, and final verification data B' is created from the plain data if alignment is success. That is, the fine branches Ac of the plain data create the final verification data B' as the comparatively fine characteristic data. The authentication library 34 scrambles this final verification data B' and transmits it to the IC chip 50 of the IC card 5.

(S38) Next, final verification is performed within the IC card 5. That is, the CPU of the IC chip 50 in the IC card 5 descrambles the scrambled final verification data B', and performs verification against the registration data B in memory. The verification result is presented to the authentication library 34.

(S40) If the verification result is satisfactory, a password number is input, and this is compared with the registered password number corresponding to the account number read from the magnetic stripe of the IC card 5.

(S42) If the result of password number comparison is satisfactory, the user inputs an amount.

(S44) The user confirms the transaction.

(S46) As a result, the service/window terminal device 3 and 8 communicates with the host. Upon a response from the host, cash is passed to the user in the case of withdrawal, and transfer confirmation is passed to the user in the case of fund transfer.

Thus data is scrambled and transmitted, and registration data B which is more important for authentication is stored within the IC card 5. Because the registration data A is registered in the IC card 5 in scrambled form, when the IC card 5 pass the data A to the authentication library 34, scrambling processing need not be performed within the IC card 5. Processing performed within the IC card 5 is descrambling and verification of the final verification data. Hence security is further improved, and the load on the CPU of the IC chip 50 in the IC card 5 is reduced.

Figure 17:
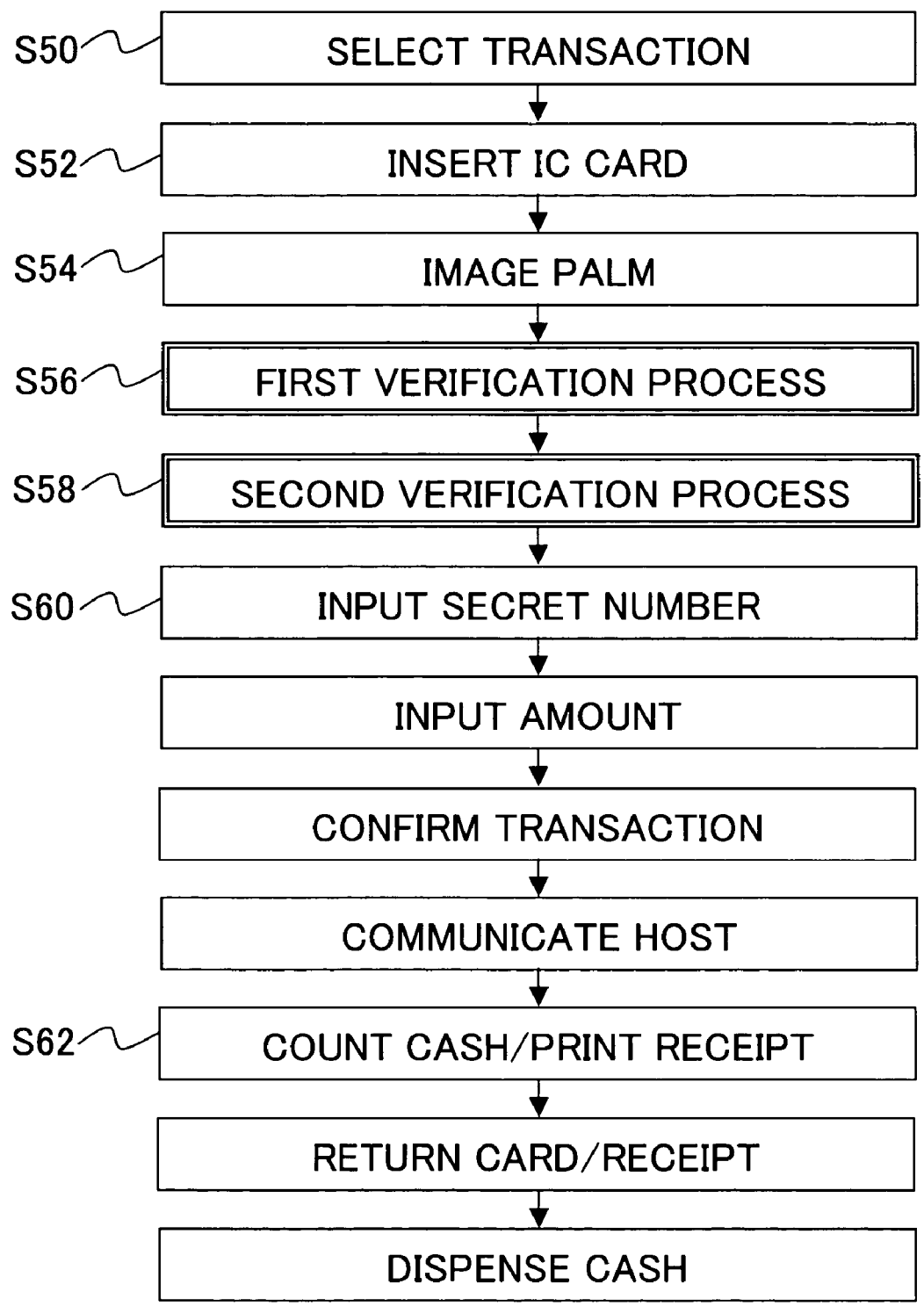
FIG. 17 is a diagram of the flow of biometrics characteristic data verification processing in another embodiment of the invention.
Figure 18:
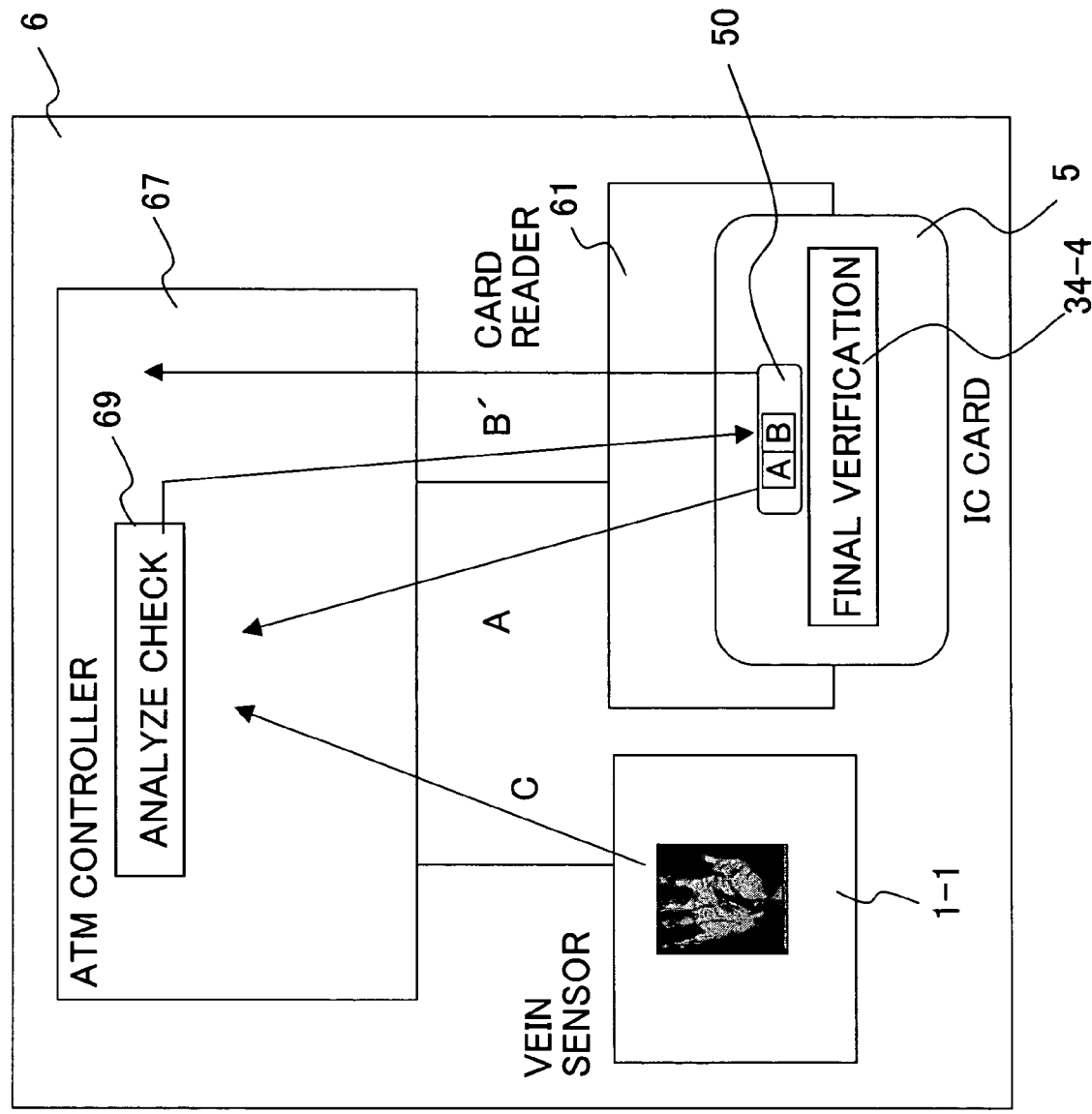
FIG. 18 shows the flow of data in the verification processing of FIG. 17.

FIG. 17 and FIG. 18 explain transaction processing, including biometrics authentication processing, in an automated transaction machine.

(S50) First the transaction is selected. The transaction is selected on the UOP 6-1 of the ATM 6.

(S52) The user inserts an IC card 5 into the IC card reader/writer 9, which reads the magnetic stripe data (account number and similar).

(S54) Next, the user places his hand over the image capture device 1-1, and an image of the palm is captured.

(S56) Similarly to step S36, the registration data A of the IC card 5 is used to perform primary verification (analysis verification) in the authentication library 69 of the control portion 67 in the ATM 6.

(S58) Next, similarly to step S38, final verification is performed within the IC card 5.

(S60) If the verification result is satisfactory, the password number is input from the UOP 6-1, and this is compared with the registered password number corresponding to the account number read from the magnetic stripe of the IC card 5. If the password verification result is satisfactory, the user inputs an amount to the UOP 6-1. The user confirms the amount, and communication with the host takes place.

(S62) Upon response from the host, the amount of cash is counted in the case of withdrawal, and a receipt is printed. The IC card 5 and receipt are returned to the user, and cash is dispensed.

Other Embodiments

In the above-described embodiment, authentication using palm vein patterns was explained; but application to authentication using finger vein patterns, palm prints and other characteristics of the palm, as well as to fingerprints, facial features, and other biometrics authentication is also possible. Automated teller machines at financial institutions were explained, but application to automated ticket dispensing machines, automated vending machines, and automated equipment in other fields, as well as to computers, the opening and closing of doors requiring individual authentication, use in place of keys, and other tasks is also possible.

In the above, embodiments of this invention have been explained; but various modifications can be made within the scope of the invention, and these modifications are not excluded from the scope of the invention.

Even when primary and secondary verification are performed by different units, the data is scrambled and transmitted, and moreover registration data B which is more important to authentication is stored within the IC card 5, and registration data A is registered in the IC card 5 in a scrambled state, so that scrambling processing need not be performed by the IC card. Because processing performed within the IC card is final verification data descrambling and verification, security can be further enhanced, and the load on the CPU of the IC chip in the IC card can be reduced.

What is claimed is:

1. A biometrics authentication device for verifying a detected biometrics characteristics data against a registered biometrics characteristic data, comprising:

an image capture device, which captures an image of a living body part, scrambles by scramble/descramble method in which an original data is restored by descrambling scrambled original data and transmits an image data of the captured image;

an IC card reader/writer, which reads and writes an IC card storing comparatively coarse first biometrics characteristic data and comparatively fine second biometrics characteristic data of a user, said IC card storing said first characteristics data in a scrambled state and said second characteristics data in a non-scrambled state; and a control unit separately provided with said IC card reader/writer, which descrambles said scrambled image data from the image capture device by said scramble/descramble method, receives scrambled first biometrics characteristic data from said IC card, descramble said scrambled first biometrics characteristic data, performs primary verification of said image data with said first biometrics characteristic data, creates final verification data from said image data when the primary verification is success, and scrambles by said scramble/descramble method and transmits to said IC card said final verification data, and wherein said IC card descrambles said scrambled final verification data by said scramble/descramble method, and performs secondary verification with said stored second biometrics characteristic data, and wherein said image capture device comprises a unit to capture images of blood vessels of a living body of said user, and wherein said first biometrics characteristic data is comparatively coarse characteristic data of said blood vessel image of said user, and said second biometrics characteristic data is comparatively fine characteristic data of said blood vessel image of same said user.

2. The biometrics authentication device according to claim 1, wherein said control unit aligns said image data and said first biometrics characteristic data and creates the final verification data from the image data.

3. The biometrics authentication device according to claim 1, wherein said control unit, at the time of registration of said biometrics characteristic data, descrambles said scrambled image data from the image capture device, creates the comparatively coarse first biometrics characteristic data and the comparatively fine second biometrics characteristic data for said user from said descrambled image data, scrambles and transmits to said IC card said first biometrics characteristic data, and transmits to said IC card said encrypted second biometrics characteristic data, and wherein said IC card stores said scrambled first biometrics data, and decrypts and stores said encrypted second biometrics characteristic data.

4. The biometrics authentication device according to claim 3, wherein said control unit scrambles said final verification data and transmits the scrambled final verification data to said IC card reader/writer, and wherein said IC card reader/writer descrambles and encrypts said scrambled final verification data and transmits the encrypted final verification data to said control unit.

5. The biometrics authentication device according to claim 1, wherein said image capture device comprises a unit to capture images of blood vessels of a palm of said user.

6. A biometrics authentication method for verifying detected biometrics characteristic data from a living body against registered biometrics characteristic data for individual authentication of a user, comprising the steps of:

capturing an image of said living body, and scrambling by scramble/descramble method in which an original data is restored by descrambling scrambled original data and transmitting an image data of the captured image to control unit;

descrambling said transmitted scrambled image data by said scramble/descramble method into said control unit;

receiving comparatively coarse first biometrics characteristic data of a user, in a scrambled state, from said IC card which stores said first characteristics data in a scrambled state and stores said second characteristics data in a non-scrambled state;

performing primary verification of said image data with said first characteristic data after descrambled, and creating final verification data from said image data when the primary verification is success into said control unit;

scrambling by said scramble/descramble method and transmitting to said IC card said final verification data; and descrambling said final verification data by said scramble/descramble method, and performing secondary verification with said stored second characteristic data, in said IC card, wherein said captured image comprises a blood vessel image of said living body, and wherein said first biometrics characteristic data is comparatively coarse characteristic data of said blood vessel image of said user, and said second biometrics characteristic data is comparatively fine characteristic data of said blood vessel image of same said user.

7. The biometrics authentication method according to claim 6, wherein said creation step comprises:

a step of aligning said image data and said first biometrics characteristic data; and a step of creating said final verification data from said image data.

8. The biometrics authentication method according to claim 6, further comprising a step of registering said characteristic data, wherein said registering step comprises the steps of:

descrambling said scrambled image data from image capture device into said control unit;

creating, from said descrambled image data, comparatively coarse first biometrics characteristic data and comparatively fine second biometrics characteristic data of said user;

scrambling said first biometrics characteristic data, and transmitting the scrambled first biometrics characteristics data to said IC card;

transmitting encrypted second biometrics characteristic data to said IC card;

decrypting said encrypted second biometrics characteristic data;

and storing the scrambled first biometrics character data and the decrypted second biometrics characteristics data, in said IC card.

9. The biometrics authentication method according to claim 8, further comprising the steps of:

scrambling said final verification data and transmitting the scrambled final verification data to an IC card reader/writer;

descrambling and encrypting said scrambled final verification data in said IC card reader/writer; and transmitting said encrypted final verification data to said control unit from said IC card reader/writer.

10. The biometrics authentication method according to claim 6, wherein said blood vessel image comprises blood vessels of a palm of said user.

* * * * *